(No Model.)

J. J. QUINN & F. C. SNEBOLD.
TWINE HOLDER AND CUTTER.

No. 451,771. Patented May 5, 1891.

WITNESSES:
N. R. Davis.
E. M. Clark

INVENTOR:
J. J. Quinn
F. C. Snebold
BY
Munn & Co.
ATTORNEYS

UNITED STATES PATENT OFFICE.

JOHN J. QUINN AND FRED C. SNEBOLD, OF DEMING, TERRITORY OF NEW MEXICO.

TWINE HOLDER AND CUTTER.

SPECIFICATION forming part of Letters Patent No. 451,771, dated May 5, 1891.

Application filed September 1, 1890. Serial No. 363,604. (No model.)

*To all whom it may concern:*

Be it known that we, JOHN J. QUINN and FRED C. SNEBOLD, of Deming, in the county of Grant and Territory of New Mexico, have invented a new and Improved Twine Holder and Cutter, of which the following is a full, clear, and exact description.

The object of the invention is to provide a new and improved twine holder and cutter which is simple and durable in construction, is designed to conveniently hold spooled or bunched twine, permits of increasing or diminishing the tension of the twine, and enables the operator to cut off the twine at any desired length.

The invention is embodied in the construction and combination of parts, as hereinafter described and claimed.

Reference is to be had to the accompanying drawings, forming a part of this specification, in which similar letters of reference indicate corresponding parts in all the figures.

Figure 1:
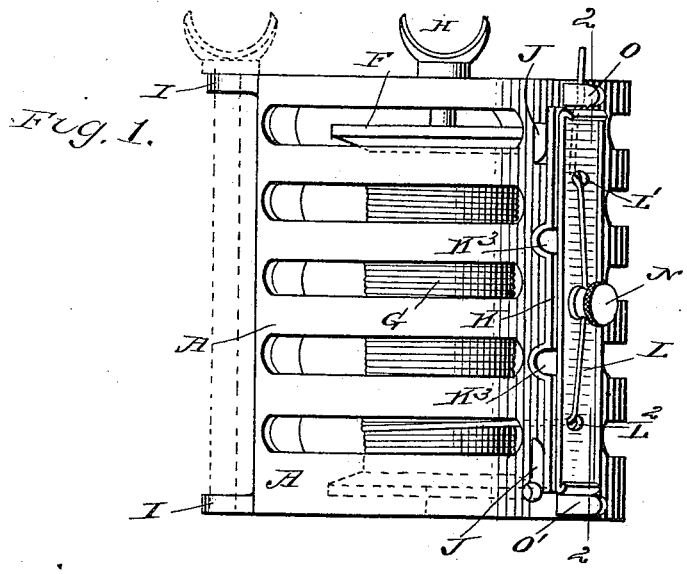
Figure 2:
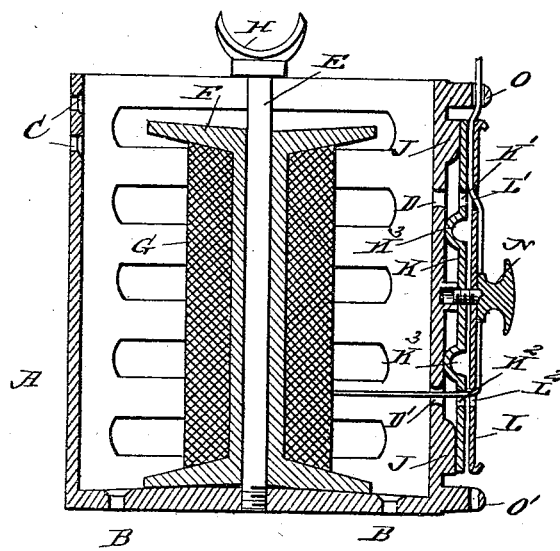
Figure 3:
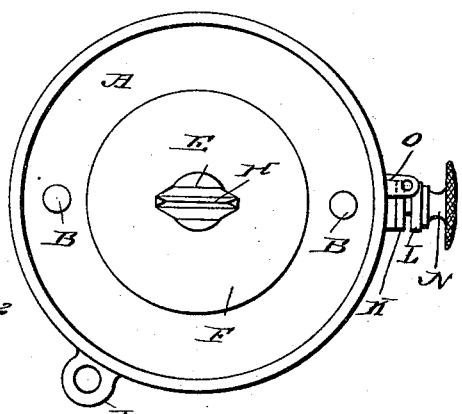

Figure 1 is a side elevation of the improvement. Fig. 2 is a diametrical sectional side elevation of the same on the line 2 2 of Fig. 1, and Fig. 3 is a plan view of the same.

The improved twine holder and cutter is provided with a suitable casing A, open at the top and provided in its bottom with screw-holes D for the passage of screws to secure the casing to a counter or desk. In the wall of the casing are also formed screw-holes C for the passage of screws in case the holder is to be secured to a wall or post. In the wall of the casing on the opposite side from the screw-holes C are formed two openings D and D', for the passage of twine from the inside of the casing to the outside. In a threaded hole in the bottom of the casing A is adapted to screw the central spindle E, on which is mounted a spool F, carrying the twine G, which, when unwound, passes through one of the openings D or D'. On the upper end of the spindle E is formed a semicircular cutting-edge H, for cutting off the twine when the desired length has been unwound from the spool F. When the twine is not on a spool, but it is bunched, then the spindle E is unscrewed and passed through eyes I, formed on the outside of the casing, so as to support said spindle, the interior of the casing now being empty for the reception of the roll of twine, one end of which is passed through one of the openings D or D'. On the outside of the casing, above and below the openings D and D', respectively, are formed lugs J, on which rest the ends of a plate K, on which is fitted a similar plate L, both plates being held in place by a set-screw N, screwing in the wall of the casing about midway between the openings D and D', as is plainly indicated in Fig. 2. In the plates K and L are provided oppositely-arranged openings K' L' and K² L², located opposite the openings D D', respectively, so that the twine can be passed from the interior of the casing through the openings D K' L' or D' K² L². In order to give the plate K a good bearing on the wall of the casing, the said plate is provided with inwardly-extending lugs K³, resting on the exterior of the casing and preventing the plate from being bent when the set-screw M is adjusted. Above the upper ends of the plates K and L is formed an eye O on the casing for the passage of the twine after it leaves the plates K and L, the latter forming a tension device for preventing undue unwinding of the twine.

The device is used as follows: When the twine is wound on a spool F, then the latter is placed on spindle E, which is then screwed into the bottom of the casing, as illustrated in Fig. 2, the spool F then being free to rotate on the spindle. The end of the twine is preferably passed through the openings D', K², and L² to the outside of the plate L, then up the same through the opening L' and between the plates K and L, so that the twine is clamped between the said plates by adjusting the set-screw N. The twine after leaving the upper ends of the plates K and L is passed through the eye O, at which point the operator can take hold of the twine when unwinding the same from the spool. The operator pulling on the twine unwinds the desired length from the spool and then cuts off the twine by passing the same over the cutting-edge H of the spindle E. The cut-off end remains in place in the eye O as the twine is securely held in place between the clamping-plates K and L. When the twine is in a bunch the spindle E is removed, as previously described, and placed in the eyes I. (See dotted lines in Fig. 1.) The end of the bunch of twine is passed through the openings D', K², and L², and then between the plates, as previously described, and through the eye O, the twine being cut off when the desired length has been unwound on the knife-edge H. When the casing C is secured on a wall or post, the twine is passed through the openings D K' L', then downward over the outside of the plate L, through the opening L² between the lower ends of the plates K and L, and is then passed through a second eye O', formed on casing A near its bottom. The operation is then the same as above described.

Having thus described my invention, what I claim as new, and desire to secure by Letters Patent, is—

1. The combination, with the casing having a lateral opening for passage of twine and the spool-holding spindle arranged vertically therein, of the apertured thread-clamping plate L, applied to the side of the casing and arranged parallel to the spindle, one of its openings being coincident with one of those in the said casing, as shown and described.

2. The combination, with the casing A, having a lateral opening and a spool-carrying spindle, of the spring thread-clamping plate L, having apertures, one of which is coincident with said opening, a screw N for holding and adjusting the said plate, and an eye arranged at top of the casing coincident with the opening and aperture, as shown and described.

JOHN J. QUINN.
FRED C. SNEBOLD.

Witnesses:
JAS. A. KINNEAR,
J. W. CUNNINGHAM.